Figure 1:
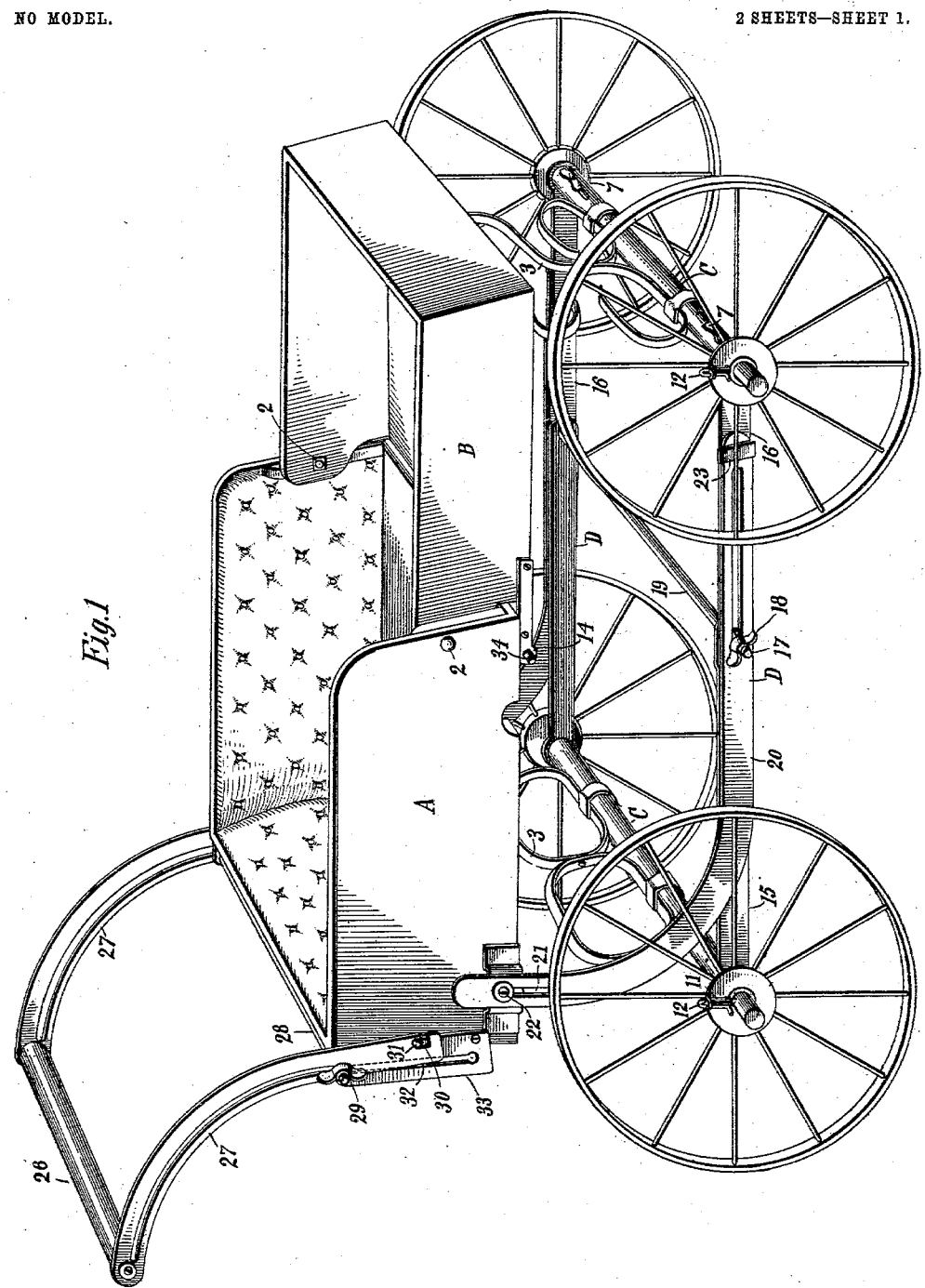

No. 745,619. PATENTED DEC. 1, 1903.
F. HUBER.
BABY CARRIAGE.
APPLICATION FILED JUNE 6, 1902.
NO MODEL. 2 SHEETS—SHEET 1.

Witnesses: Frank Huber Inventor
by
Attorney

No. 745,619. PATENTED DEC. 1, 1903.
F. HUBER.
BABY CARRIAGE.
APPLICATION FILED JUNE 6, 1902.
NO MODEL. 2 SHEETS—SHEET 2.
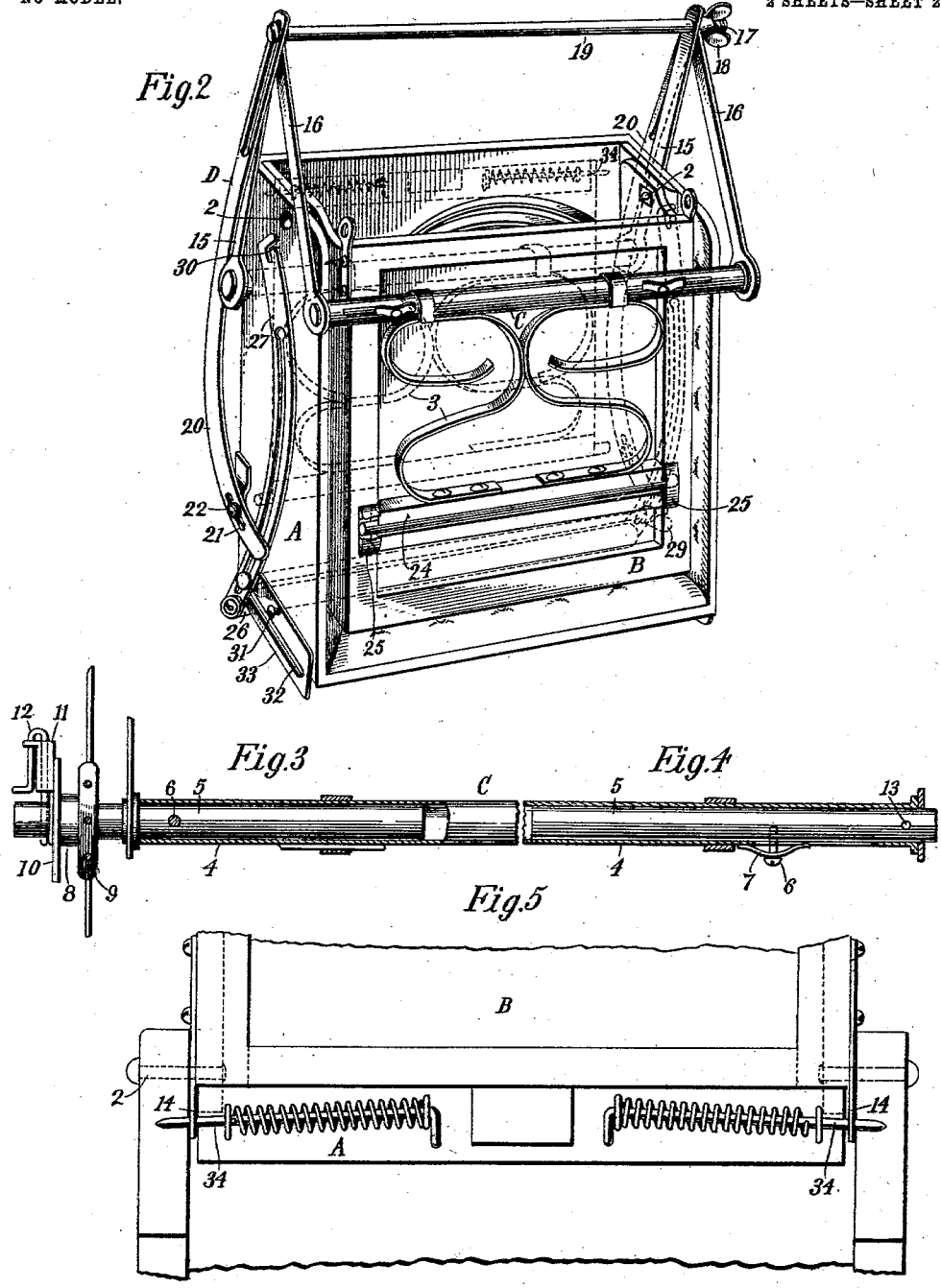
Witnesses: Frank Huber Inventor
By T. D. Merwin Atty No. 745,619. Patented December 1, 1903.

UNITED STATES PATENT OFFICE.

FRANK HUBER, OF BROOKLYN, NEW YORK.

BABY-CARRIAGE.

SPECIFICATION forming part of Letters Patent No. 745,619, dated December 1, 1903.

Application filed June 6, 1902. Serial No. 110,408. (No model.)

*To all whom it may concern:*

Be it known that I, FRANK HUBER, of Brooklyn, county of Kings, State of New York, have invented a new and useful Baby-Carriage, of which the following is a specification.

My invention relates to improvements in baby-carriages, its object being to provide a collapsible structure which can be quickly and easily knocked down and packed in small compass for transportation and storage; and it consists in the features of construction hereinafter particularly described and claimed.

In the accompanying drawings, forming part of this specification, Figure 1 is a perspective view of the carriage set up and ready for use. Fig. 2 is a perspective view of the same when knocked down and folded together in condition for transportation. Fig. 3 is a detail sectional view of one end of the carriage-axle, showing the manner of connecting the wheel thereto. Fig. 4 is a similar view of the end of the axle with the wheel detached therefrom; and Fig. 5 is a detail of a portion of the carriage-body, showing the bolts for locking the two parts of the body in extended or open position, as shown in Fig. 1.

As shown in the drawings, the body of the carriage is made up of the two parts A and B, which are hinged together by means of bolts 2, so that the forward part B may be folded over and fit within the wider part A. The carriage-body is supported in the usual manner upon springs 3, mounted upon axles C, which in turn are connected together by the side bars D. Each axle is constructed, as shown in Figs. 3 and 4, composed of a tube 4, within which are slidably arranged the wheel-spindles 5. These spindles are adjusted in position by means of the pin or stud 6, secured to the spindle and extending through a slotted opening in the tube 4, the spindles being held in adjusted positions by means of the spring 7, bearing upon the exterior of the tube 4, the screw 6 passing through the spring and into the spindle and holding the spring with requisite pressure against the tube. The hub 8 of the wheel 9 is held in place upon the spindle by the disk 10, having a sleeve 11, in which slides a linchpin 12, adapted to pass through the hole 13 in the end of the spindle and by means of which the wheel can be quickly secured in place upon the axle or detached therefrom when it is desired to knock down the vehicle. The two members A and B of the body are held in extended position, as shown in Fig. 1, by means of the spring-bolts 34, slidably mounted upon the part A and adapted to engage ears 14 upon the part B, as clearly shown in Fig. 5. The side bars D are made up of the members 15 and 16, connected, respectively, to the front and rear axles and hinged together by means of the pintle 17, extending through both side bars, having suitable securing-nuts 18 and preferably having a sleeve 19, against the ends of which the side bars D abut. Each of the curved brace-bars 20 is provided at its rear end with a slot 21, by means of which it is connected to a bolt or pin 22, entering the carriage-body, the slot permitting vertical movement of the body of the carriage in use and the yielding action of the supporting-spring. The forward end of the bar is also provided with a slot through which the pintle 17 passes and by means of which it is held against the members of the side bar, the tip of the bar 20 being passed under and held by a loop 23.

In order to render the vehicle collapsible, the bolsters 24 are mounted to turn through an arc of a circle in bearings 25, so as to permit the connected spring and axle to lie flat against the bottom of the body, as shown in Fig. 2.

The handle 26 has curved and slotted side bars 27, through which passes the rod 28, having a securing or set nut 29. The lower end of each of the bars 27 has a bayonet-notch 30, adapted to engage the pin 31 when the handle is drawn out in position for use, as shown in Fig. 1. A rod 28, working in the slots 32 of the plates 33, is secured to the carriage-body.

From the foregoing description the construction of the vehicle is clearly set forth, and the manner of knocking it down may be described as follows: The linchpins 12 being removed, the wheels are slipped off their spindles and the spindles thrust inward in the axles, the spring-bolts 34 are shot back, the set-nut 18 loosened, and the body member B folded into the member A, the springs 3 and axles C lying flat against the bottoms A and B, respectively. The wheels may then be placed in the pocket formed by the two members of the body and the nut 29 loosened and the handle 26 slipped down close to the body. The vehicle thus forms a compact parcel, the rod 19 serving as a convenient handle for carrying the same.

I claim—

1. In a collapsible baby-carriage, the combination of a body having sections hinged so as to fold one within the other, with axles, sectional side bars connecting said axles, and springs connected to the axles and pivotally connected one to each member of said sectional body.

2. In a collapsible baby-carriage, the combination of a body having sections hinged so as to fold one within the other, with axles, sectional side bars connecting said axles, springs connected to the axles and pivotally connected one to each member of said sectional body, and brace-bars adjustably connected to said side bars and also to the body.

3. In a collapsible baby-carriage, a running-gear frame composed of front and rear axles, sectional side bars extending between said axles, a pivot member upon which the sectional members of the side bars turn in collapsing the carriage, and means clamping the sections of the side bars together when in running position.

4. In a collapsible baby-carriage, a running-gear frame composed of front and rear axles, sectional side bars extending between said axles, and means clamping the sections of said side bars together when in running position.

5. In a collapsible baby-carriage, a body portion composed of two members folding one within the other when the carriage is collapsed, two bolsters, one pivoted to each of the members of the body portion, front and rear axles, and springs connecting said axles and bolsters.

6. In a collapsible baby-carriage, a body portion, a running-gear frame composed of front and rear axles and sectional side bars connecting said axles, brace-bars connected to the body, and a clamping device securing the sections of the side bars and said brace-bars together.

7. In a baby-carriage, a running-gear frame, front and rear axles, sectional side bars connecting said axles, means spreading or spacing the side bars at a point intermediate the axles, and means clamping the sections of the side bars together.

8. In a baby-carriage, the combination with a body, of axles, means connecting said axles and body, and means fastening the wheels on the axle, which means comprise a disk or plate perforated to receive the axle and having a pin movably mounted thereon adapted to pass through a hole in said axle.

9. In a baby-carriage, the combination with a body, of axles composed of a sleeve having a sectional spindle or shaft adjustably secured therein, fastening means retaining the wheels on the axles which means comprise a disk or plate perforated to receive the axle and a pin slidably mounted thereon adapted to pass through a hole in said axle, and means connecting said axle and body.

10. In a baby-carriage, the combination with a body, of axles composed of a hollow sleeve having spindles or shafts therein, means adjustably securing said spindles in said sleeve, consisting of a headed stud attached to the spindle and extending through a slot in said sleeve and a spring carried by said stud bearing on said sleeve, and connecting means between said body and axle.

11. The combination of the two-part body, its connecting-hinge, means for locking the parts in open position, supporting-springs hinged to the body, the tubular axles, the wheel-spindles slidable within the same, removable carrying-wheels, the two-part side bars, their hinge and set-nut connection, the brace-bars connecting the body with the side bars, and the extensibly-adjustable vehicle-handle, substantially as set forth.

Signed at New York city this 20th day of May, 1902.

FRANK HUBER.

Witnesses:
CHAS. F. TUCKER,
DAVIS CARPENTER.